US006606196B2

(12) United States Patent
Mitsuishi et al.

(10) Patent No.: US 6,606,196 B2
(45) Date of Patent: Aug. 12, 2003

(54) OPTICAL ELEMENT HAVING ANTIREFLECTION FILM

(75) Inventors: Takeshi Mitsuishi, Tokyo (JP); Hitoshi Kamura, Tokyo (JP); Kenichi Shinde, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/939,664

(22) Filed: Aug. 28, 2001

(65) Prior Publication Data
US 2003/0021033 A9 Jan. 30, 2003

(30) Foreign Application Priority Data

Aug. 29, 2000 (JP) ........................... 2000-258628
Apr. 27, 2001 (JP) ........................... 2001-130754

(51) Int. Cl.⁷ .................................. G02B 1/11
(52) U.S. Cl. .................. 359/582; 359/580; 359/585; 359/586; 359/588
(58) Field of Search .................. 359/580, 581, 359/586, 588, 582, 585

(56) References Cited

U.S. PATENT DOCUMENTS

| | | | | |
|---|---|---|---|---|
| 3,432,225 | A | * 3/1969 | Rock | 359/588 |
| 4,128,303 | A | * 12/1978 | Onoki et al. | 359/588 |
| 4,264,133 | A | * 4/1981 | Sakurai | 359/586 |
| 5,268,781 | A | 12/1993 | Shigeta et al. | |
| 5,372,874 | A | * 12/1994 | Dickey et al. | 204/192.27 |
| 5,667,880 | A | 9/1997 | Okaniwa | 359/359 |
| 5,691,044 | A | 11/1997 | Oyama et al. | 313/461 |
| 5,693,366 | A | 12/1997 | Mase et al. | 427/164 |
| 5,725,959 | A | * 3/1998 | Terada et al. | 359/359 |
| 5,783,049 | A | 7/1998 | Bright et al. | 204/192.14 |
| 5,942,338 | A | 8/1999 | Arbab et al. | 428/623 |
| 5,963,373 | A | 10/1999 | Kayanoki | 351/166 |
| 6,353,501 | B1 | 3/2002 | Woodruff et al. | 359/360 |
| 6,358,617 | B1 | 3/2002 | Ohsaki et al. | 359/359 |

FOREIGN PATENT DOCUMENTS

| | | | | |
|---|---|---|---|---|
| DE | 2738044 A | * 3/1978 | | 359/580 |
| EP | 0 578 220 A2 | 1/1994 | | |
| JP | A 0066802 | * 6/1981 | | 359/588 |
| JP | 60-225101 A | * 11/1985 | | |
| JP | 186202 | 8/1987 | | |
| JP | 2291501 | 12/1990 | | |
| JP | 3203701 A | * 9/1991 | | 359/586 |
| JP | 05-11101 | * 1/1993 | | 359/586 |
| JP | 05-34502 | * 2/1993 | | |
| JP | 06-214101 A | * 8/1994 | | 359/580 |

OTHER PUBLICATIONS

William H. Southwell, "Coating design using very thin high– and low–index layers", Applied Optics, vol. 24, No. 4, pp457–460. Feb. 15, 1985.*

M. Fliedner et al., Plasma Ion Assisted Coating of Ophthalmic Optics, Society of Vacuum Coaters, Albuquerque, NM, pp. 237–241 (1995).

Copending Application No. 09/939,668.

\* cited by examiner

Primary Examiner—John Juba
(74) Attorney, Agent, or Firm—Finnegan, Henderson, Farabow, Garrett & Dunner, LLP

(57) ABSTRACT

An optical element having a plastic substrate and an antireflection film of a $\lambda/4$-$\lambda/2$-$\lambda/4$ or $\lambda/4$-$\lambda/4$-$\lambda/2$-$\lambda/4$ type ($\lambda$=500 nm) provided in that order on the plastic substrate, wherein the layer of $\lambda/2$ is a high-refraction equivalent film containing at least three layers and having a refractive index of from 1.80 to 2.40, and the even-numbered layer(s) of the equivalent film is an $SiO_2$ layer or a layer in which $SiO_2$ is a main component.

17 Claims, No Drawings

OPTICAL ELEMENT HAVING ANTIREFLECTION FILM

The present invention relates to an optical element having an antireflection film on a plastic substrate. It further relates to an optical element having an antireflection film on a plastic substrate that has good heat resistance.

Optical elements having an antireflection film formed on a plastic substrate were known heretofore. For example, Japanese Patent Laid-Open No. 291501/1990 discloses an optical element formed with an antireflection film that has a high-refraction layer of $\lambda/2$ containing titanium dioxide as a major component.

In general, however, the heat resistance of such optical elements having an antireflection film provided on a plastic substrate is not good compared with that of optical elements comprising an antireflection film provided on a glass substrate, because the former cannot be heated during vapor deposition. Therefore, there is a need for optical elements having an antireflection film provided on a plastic substrate having improved heat resistance.

The inventors have determined that the heat resistance of an optical element with a plastic substrate is significantly improved by using an equivalent film of at least three layers, while utilizing a high-refraction layer and a layer made of a low-refraction substance such as silicon dioxide.

Heretofore, the high-refraction layer of $\lambda/2$ was constructed of a single layer of a high-refraction vapor-deposited substance such as titanium dioxide, zirconium oxide or tantalum oxide. A single layer provided the antireflection property and promoted production efficiency. In this connection, if the high-refraction layer of $\lambda/2$ is provided with a layer made of a low-refraction substance, such as silicon dioxide, it will lower the refractive index of the high-refraction layer and therefore possibly lower the antireflection property of the antireflection film. For these reasons, such a construction has not heretofore been proposed.

The invention provides an optical element having an antireflection film that comprises a plastic substrate and an antireflection film of a $\lambda/4$-$\lambda/2$-$\lambda/4$ or $\lambda/4$-$\lambda/4$-$\lambda/2$-$\lambda/4$ type ($\lambda$=500 nm) provided in that order on the plastic substrate. The layer of $\lambda/2$ is an equivalent film containing at least three layers and having a refractive index of from 1.80 to 2.40, and the even-numbered layer(s) of the equivalent film is a silicon dioxide layer or a layer in which silicon dioxide is the main component. For example, the even-numbered layer could be a layer of more than 80% $SiO_2$ and the balance other metal oxides such as $Al_2O_3$. According to the invention, when the high-refraction layer of $\lambda/2$ is a three-layered equivalent film, an optical element having good heat resistance and antireflection property is obtained. For further improving the heat resistance and the antireflection property, the high-reflection layer of $\lambda/2$ may be made of an equivalent film of more than three layers.

To obtain good heat resistance and antireflection property, the odd-numbered layers of the equivalent film of $\lambda/2$ contain a known high-refraction vapor-deposited substance such as titanium oxide, zirconium oxide, tantalum oxide and niobium oxide, more preferably a layer made of at least one vapor-deposited substance selected from $TiO_2$, $Ta_2O_5$ and $Nb_2O_5$, and most preferably a layer of $Nb_2O_5$ as the vapor-deposited substance. To promote production efficiency, it is desirable that the odd-numbered layers all have the same film composition.

The resultant refractive index of the high-refraction layer of $\lambda/2$ is in the range of from 1.80 to 2.40, the range of from 1.85 to 2.25 having better physical properties. The film constitution of the high-refraction layer of $\lambda/2$ is so made that it satisfies the defined range of the refractive index.

According to one embodiment of the invention, the layer of $\lambda/4$ to be formed on the high-refraction layer of $\lambda/2$ is a silicon dioxide layer that serves as a low-refraction layer in the antireflection film. The layer of $\lambda/4$ to be formed under the high-refraction layer of $\lambda/2$ is usually an equivalent film of at least two layers for good antireflection property and heat resistance, but other embodiments may contain three and five layers. The film is generally constructed of a two-layered equivalent film made of a silicon dioxide layer and a layer of a high-refraction vapor-deposited substance such as titanium oxide, zirconium oxide, tantalum oxide and niobium oxide, or a two-layered equivalent film made of a silicon dioxide layer and a niobium oxide layer. To promote production efficiency, it is desirable that the raw materials for vapor deposition in forming the equivalent film of $\lambda/4$ are the same as those for vapor deposition in forming the equivalent film of $\lambda/2$.

Where a niobium oxide layer is used as the layer of high-refraction substance, it is preferred to use 100% niobium oxide for the vapor-deposited substance to form the layer according to an ion-assisted process.

The "ion-assisted process" referred to herein is a well known process also called "ion beam assisted vapor deposition process". According to this process, a material is deposited on a substrate, such as a lens substrate, by vapor deposition using an ion plasma in a gas atmosphere, such as argon (Ar), nitrogen, oxygen, or mixtures thereof. In a common apparatus suitable to perform this process, typical vapor deposition conditions are an accelerating voltage of 100–350V, and an accelerating current of 50–150 mA. A detailed description is given in e.g., U.S. Pat. No. 5,268,781. Further details can be derived from M. Fliedner et al., Society of Vacuum Coaters, Albuquerque, N.Mex., USA.p237–241, 1995 as well as from the references cited therein.

In the ion-assisted process, argon (Ar) may be used as the ionizing gas for preventing oxidation of films being formed. Although argon is generally preferred, other ionizing gases such as oxygen and nitrogen, or mixtures of these gases could also be used. This stabilizes the quality of the films formed and enables easy control of the thickness of the films by the use of an optical film thickness meter.

A niobium oxide layer may also be formed by a method of sintering a powder containing niobium oxide, zirconium oxide and yttrium oxide and optionally containing aluminum oxide, generating a vapor of the oxide mixture from the sintered material, and depositing the vapor on a substrate. In the method of depositing the vapor on the substrate, a blend ratio of the sintered material is preferably such that niobium oxide accounts for from 60 to 90% by weight of the whole of the composition for vapor deposition, zirconium oxide for from 5 to 20% by weight, and yttrium oxide for from 5 to 35% by weight, for ensuring good physical properties of the film. In case where aluminum oxide is added, its amount is preferably from 0.3 to 7.5% by weight of the total of zirconium oxide and yttrium oxide therein.

According to another embodiment of the invention, the optical element has a basic layer provided between the plastic substrate and the antireflection film. For the basic layer, preferred is silicon dioxide or metallic niobium, and more preferred is metallic niobium. In case of the silicon dioxide layer, its film thickness is preferably from 0.1 $\lambda$ to 5 $\lambda$ to ensure appropriate film strength; and in case of metallic niobium, its film thickness is preferably from 0.005 $\lambda$ to 0.015 $\lambda$, for ensuring the film transparency.

The advantages of the basic layer of metallic niobium are that it ensures good adhesiveness between the plastic substrate and the antireflection film, and provides an optical element that is excellent in heat resistance, impact resistance and abrasion resistance, and its absorption intrinsic to metal is low. Preferably, the metallic niobium (Nb) layer is formed in an ion-assisted process.

In the ion-assisted process, argon (Ar) is generally used as the ionizing gas for preventing oxidation of the film being formed. This stabilizes the quality of the film formed and enables easy control of the thickness of the film by the use of an optical film thickness meter.

For ensuring good adhesiveness between the plastic substrate and the basic layer and for ensuring good uniformity of the initial film morphology in vapor deposition in the ion-assisted process, the plastic substrate may be subjected to ion gun pretreatment before the basic layer is formed thereon. The ionizing gas in the ion gun pretreatment may be any of oxygen, nitrogen, Ar, or mixtures thereof. For the preferred power range, the accelerating voltage is from 50 V to 200 V, and the accelerating current is from 50 mA to 150 mA.

The antireflection film in the optical element of the invention may be formed by any suitable process. For example, it may be formed by vapor deposition, such as chemical vapor deposition (CVD) or physical vapor deposition (PVD), or by other methods such as an ion-assisted process.

The plastic substrate used for the optical substrate of the invention is not specifically defined, including, for example, methyl methacrylate homopolymers, copolymers of methyl methacrylate and one or more other monomers such as diethylene glycol bisalkyl carbonate or benzyl methacrylate, diethylene glycol bisallyl carbonate homopolymers, copolymers of diethylene glycol bisallyl carbonate and one or more other monomers such as methyl methacrylate and benzyl methacrylate, sulfur-containing copolymers, halogen-containing copolymers, polycarbonates, polystyrenes, polyvinyl chlorides, unsaturated polyesters, polyethylene terephthalates, and polyurethanes.

If desired, the optical element of the invention may have a cured film between the plastic substrate and the basic layer. The cured film may be made by curing a coating composition that comprises metal oxide colloid particles and an organosilicon compound.

The metal oxide colloid particles generally are fine metal oxide particles having a particle size of 1–500 nm. The colloid particles may be made of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO) or antimony oxide ($Sb_2O_5$). One or more of these metal oxides may be used either singly or in admixture of two or more thereof.

Several embodiments of the optical element of the invention are described by the following structures (a) to (c).

[023] Structure (a)

| Plastic substrate | Basic layer | Range of refractive index | |
|---|---|---|---|
| 1st Layer ($SiO_2$ layer) | | 1.43 to 1.47 | |
| 2nd Layer (high-refraction layer) | λ/4 | 2.04 to 2 37 | Resultant refractive |
| 3rd Layer ($SiO_2$ layer) | | 1.43 to 1.47 | index |
| | | | 1.65 to 1.80 |
| 4th Layer (high-refraction layer) | | 2.04 to 2.37 | Resultant refractive |
| 5th Layer ($SiO_2$ layer) | λ/2 | 1.43 to 1.47 | index |
| 6th Layer (high-refraction layer) | | 2.04 to 2.37 | 1.85 to 2.25 |
| 7th Layer ($SiO_2$ layer) | λ/4 | 1.40 to 1.47 | |

[024] Structure (b)

| Plastic substrate | Basic layer | Range of refractive index | |
|---|---|---|---|
| 1st Layer ($SiO_2$ layer) | | 1.43 to 1.47 | |
| 2nd Layer (high-refraction layer) | λ/4 | 2 04 to 2.37 | Resultant refractive |
| 3rd Layer ($SiO_2$ layer) | | 1.43 to 1.47 | index |
| | | | 165 to 1.80 |
| 4th Layer (high-refraction layer) | | 2.04 to 2 37 | Resultant refractive |
| 5th Layer ($SiO_2$ layer) | | 1.43 to 1.47 | index |
| 6th Layer (high-refraction layer) | λ/2 | 2.04 to 2.37 | 185 to 2.25 |
| 7th Layer ($SiO_2$ layer) | | 1.43 to 1 47 | |
| 8th Layer (high-refraction layer) | | 2.04 to 2.37 | |
| 9th Layer ($SiO_2$ layer) | λ/4 | 1.43 to 1.47 | |

[025] Structure (c)

| Plastic substrate | Basic layer | Range of Refractive Index | |
|---|---|---|---|
| 1st Layer (metallic niobium layer) | Film thickness: 0 005 λ to 0.015 λ | 1.40 to 1.47 | |
| 2nd Layer ($SiO_2$ layer) | λ/4 | 1.43 to 1.47 | Resultant |
| 3rd Layer (high-refraction layer) | | 2.04 to 2.37 | refractive index |
| 4th Layer ($SiO_2$ layer) | | 1 43 to 1.47 | 1.65 to 1 80 |
| 5th Layer (high-refraction layer) | λ/2 | 2.04 to 2.37 | Resultant |
| 6th Layer ($SiO_2$ layer) | | 1.43 to 1.47 | refractive index |
| 7th Layer (high-refraction layer) | | 2.04 to 2.37 | 1.85 to 2.25 |
| 8th Layer ($SiO_2$ layer) | λ/4 | 1.43 to 1.47 | |

EXAMPLES

The invention is described in more detail with reference to the following Examples, which, however, are not intended to restrict the scope of the invention.

The physical properties of the optical elements obtained in the following Examples 1 to 6 were measured according to the methods mentioned below.

(1) Luminous Transmittance:

Using a spectrophotometer, U-3410 made by Hitachi, Ltd., the luminous transmittance, Y, of a plastic lens as a sample, having an antireflection film on both surfaces, was measured.

(2) Luminous Reflectance:

Using a spectrophotometer, U-3410 made by Hitachi, Ltd., the luminous reflectance, Z, of a plastic lens as a sample, having an antireflection film on both surfaces, was measured.

(3) Adhesiveness:

Using a cutting tool, the surface of a plastic lens was cut to have 100 cross-cuts of 1 mm×1 mm each. An adhesive tape, Cellotape, was stuck on its cross-cut area, and peeled off at a stroke. The number of cross-cuts remaining was counted and shown in the following Tables, in which (number of cross-cuts remained)/100 indicates the adhesiveness.

(4) Abrasion Resistance:

The surface of a plastic lens was rubbed with steel wool under a load of 1 kgf/cm$^2$ applied thereto. After 20 strokes of rubbing, the surface condition of the plastic lens was evaluated according to the following criteria:

UA: Scratched little.

A: A few thin scratch marks found.

B: Many thin scratch marks and a few thick scratch marks found.

C: Many thin and thick scratch marks found.

D: Almost completely peeled.

(5) Heat Resistance:

A plastic lens was put into an oven preheated to a selected temperature, and was left there for 1 hour. This experiment was performed at different temperatures, starting from 50° C. with increments of 5°. The temperature at which the lens could not withstand the heat treatment and was cracked after 1 hour was measured. This temperature is given as heat resistance in the Tables below.

(6) Alkali Resistance:

A plastic lens was dipped in an aqueous 10% NaOH solution for 1 hour, and its surface condition was evaluated according to the following criteria:

UA: Changed little.

A: A few peeled dots found.

B: Many peeled dots found everywhere on the surface.

C: Many peeled dots found everywhere on the surface, and a few peeled squares found.

D: Almost completely peeled.

(7) Impact Resistance:

A plastic lens having a center thickness of 2.0 mm and a power of lens of 0.00 was prepared and subjected to a drop ball test as defined by the Food and Drug Administration. "O" indicates good samples; and "x" indicates rejected samples.

Examples 1 to 6

Preparation of Substrate A and Hard Coat Layer A 90 parts by weight of colloidal silica (Snowtex-40, available from Nissan Chemical Industries, Ltd.), 81.6 parts by weight of methyltrimethoxysilane and 176 parts by weight of γ-glycidoxypropyltrimethoxysilane as organosilicon compounds, 2.0 parts by weight of 0.5 N hydrochloric acid, 20 parts by weight of acetic acid, and 90 parts by weight of water were charged into a glass container, and the solution was stirred at room temperature for 8 hours. Then, the resulting solution was left at room temperature for 16 hours to obtain a hydrolyzed solution. To this solution were added 120 parts by weight of isopropyl alcohol, 120 parts by weight of n-butyl alcohol, 16 parts by weight of aluminum acetylacetone, 0.2 parts by weight of a silicone surfactant, and 0.1 parts by weight of a UV absorbent. The mixture was stirred at room temperature for 8 hours, and then aged at room temperature for 24 hours to obtain a coating solution.

A plastic lens substrate (made from diethylene glycol bisallyl carbonate, and having a refractive index of 1.50, a center thickness of 2.0 mm and a power of lens of 0.00—this may be hereinafter referred to as "substrate A"), which had been pretreated with an aqueous alkaline solution, was dipped in the coating solution. After completion of dipping, the plastic lens was taken out at a pulling rate of 20 cm/min. Then, the plastic lens was heated at 120° C. for 2 hours to form a cured film. Next, the resulting plastic lens was subjected to an ion gun treatment according to an ion-assisted process using an Ar gas under the condition of the ion acceleration voltage and exposure time as shown in Tables 1 to 6, thereby making it have a cured hard coat layer (this is referred to as "layer A").

Formation of Basic Layer and Antireflection Film

Next, a functional film composed of 8 layers shown in Tables 1 to 3 was formed on the hard coat layer A, according to an ion-assisted process under the condition shown in Tables 1 to 3, thereby obtaining plastic lenses.

The plastic lenses were evaluated according to the test methods (1) to (7) mentioned above, and the results are shown in Tables 1 to 3. In the Tables, λ indicates the wavelength of the light applied, and λ=500 nm. Accordingly, the film thickness for the basic layer in Example 1 should be understood to be 0.008 (500 nm) or 4.0 nm. The resultant refractive indices of λ/4 and λ/2 in Examples 1 to 6 are shown in Table 8.

TABLE 1

| | Example 1 | Example 2 |
|---|---|---|
| Plastic lens substrate | Diethylene glycol bisallyl carbonate (Substrate A) | Diethylene glycol bisallyl carbonate (Substrate A) |
| Hard coat layer | Layer A | Layer A |
| Ion acceleration voltage for pretreatment | 150 V | 150 V |
| Current | 100 mA | 100 mA |
| Exposure time | 60 sec | 60 sec |
| Gas used | Ar | Ar |

TABLE 1-continued

|  |  | Type of film | Film thickness | Setting values for ion gun | | Type of film | Film thickness | Setting values for ion gun | |
|---|---|---|---|---|---|---|---|---|---|
| 1st Layer | Basic layer | Nb | 0.008 λ | 150 V | 100 mA | Nb | 0.008 λ | 150 V | 100 mA |
| 2nd Layer |  | SiO$_2$ | 0.0157 λ | 450 V | 160 mA | SiO$_2$ | 0.044 λ | 450 V | 160 mA |
| 3rd Layer | λ/4 | TiO$_2$ | 0.0567 λ | 360 V | 105 mA | TiO$_2$ | 0.058 λ | 360 V | 105 mA |
| 4th Layer |  | SiO$_2$ | 0.098 λ | 450 V | 160 mA | SiO$_2$ | 0.097 λ | 450 V | 160 mA |
| 5th Layer | λ/2 | TiO$_2$ | 0.2329 λ | 360 V | 105 mA | TiO$_2$ | 0.196 λ | 360 V | 105 mA |
| 6th Layer |  | SiO$_2$ | 0.0218 λ | 450 V | 160 mA | SiO$_2$ | 0.047 λ | 450 V | 160 mA |
| 7th Layer |  | TiO$_2$ | 0.2215 λ | 360 V | 105 mA | TiO$_2$ | 0.176 λ | 360 V | 105 mA |
| 8th Layer | λ/4 | SiO$_2$ | 0.2509 λ | 450 V | 160 mA | SiO$_2$ | 0.260 λ | 450 V | 160 mA |

| | | |
|---|---|---|
| Gas used for ion assistance | Ar gas for Nb and SiO$_2$ Mixed gas of O$_2$/Ar (1/1) for TiO$_2$ | Ar gas for Nb and SiO$_2$ Mixed gas of O$_2$/Ar (1/1) for TiO$_2$ |

Evaluation of performance of plastic lens

| | | |
|---|---|---|
| Luminous reflectance, Y % | 0.68% | 0.82 % |
| Luminous transmittance, Z % | 99.3% | 99.0 % |
| Adhesiveness | 100/100 | 100/100 |
| Abrasion resistance | UA to A | UA to A |
| Heat resistance | 100° C. | 100° C. |
| Alkali resistance | UA to A | UA to A |
| Impact resistance | O | O |

TABLE 2

|  | Example 3 | Example 4 |
|---|---|---|
| Plastic lens substrate | Diethylene glycol bisallyl carbonate (Substrate A) | Diethylene glycol bisallyl carbonate (Substrate A) |
| Hard coat layer | Layer A | Layer A |
| Ion acceleration voltage for pretreatment | 150 V | 150 V |
| Current | 100 mA | 100 mA |
| Exposure time | 60 sec | 60 sec |
| Gas used | Ar | Ar |

|  |  | Type of film | Film thickness | Setting values for ion gun | | Type of film | Film thickness | Setting values for ion gun | |
|---|---|---|---|---|---|---|---|---|---|
| 1st Layer | Basic layer | Nb | 0.008 λ | 150 V | 100 mA | Nb | 0.008 λ | 150 V | 100 mA |
| 2nd Layer | λ/4 | SiO$_2$ | 0.0292 λ | 450 V | 160 mA | SiO$_2$ | 0.0209λ | 450 V | 160 mA |
| 3rd Layer |  | Ta$_2$O$_5$ | 0.0189 λ | 420 V | 120 mA | Ta$_2$O$_5$ | 0.052 λ | 420 V | 120 mA |
| 4th Layer |  | SiO$_2$ | 0.5840 λ | 450 V | 160 mA | SiO$_2$ | 0.1084 λ | 450 V | 160 mA |
| 5th Layer | λ/2 | Ta$_2$O$_5$ | 0.1336 λ | 420 V | 120 mA | Ta$_2$O$_5$ | 0.1880 λ | 420 V | 120 mA |
| 6th Layer |  | SiO$_2$ | 0.0593 λ | 450 V | 160 mA | SiO$_2$ | 0.0484 λ | 450 V | 160 mA |
| 7th Layer |  | Ta$_2$O$_5$ | 0.2498 λ | 420 V | 120 mA | Ta$_2$O$_5$ | 0.1820 λ | 420 V | 120 mA |
| 8th Layer | λ/4 | SiO$_2$ | 0.2623 λ | 450 V | 160 mA | SiO$_2$ | 0.2681 λ | 450 V | 160 mA |

| | | |
|---|---|---|
| Gas used for ion assistance | Ar gas for Nb and SiO$_2$ Mixed gas of O$_2$/Ar (9/1) for Ta$_2$O$_5$ | Ar gas for Nb and SiO$_2$ Mixed gas of O$_2$/Ar (9/1) for Ta$_2$O$_5$ |

Evaluation of performance of plastic lens

| | | |
|---|---|---|
| Luminous reflectance, Y % | 0.80% | 0.60% |
| Luminous transmittance, Z % | 99.1 % | 99.1 % |
| Adhesiveness | 100/100 | 100/100 |
| Abrasion resistance | UA | UA |
| Heat resistance | 95° C. | 95° C. |
| Alkali resistance | UA | UA |
| Impact resistance | O | O |

TABLE 3

|  | Example 5 | Example 6 |
|---|---|---|
| Plastic lens substrate | Diethylene glycol bisallyl carbonate (Substrate A) | Diethylene glycol bisallyl carbonate (Substrate A) |
| Hard coat layer | Layer A | Layer A |
| Ion acceleration voltage for pretreatment | 150 V | 150 V |
| Current | 100 mA | 100 mA |
| Exposure time | 60 sec | 40 sec |
| Gas used | Ar | Ar |

TABLE 3-continued

|  |  | Type of film | Film thickness | Setting values for ion gun | | Type of film | Film thickness | Setting values for ion gun | |
|---|---|---|---|---|---|---|---|---|---|
| 1st Layer | Basic layer | Nb | 0.008 λ | 150 V | 100 mA | Nb | 0.008 λ | 150 V | 100 mA |
| 2nd Layer | λ/4 | SiO$_2$ | 0.0209 λ | 450 V | 160 mA | SiO$_2$ | 0.0209 λ | 450 V | 160 mA |
| 3rd Layer |  | Nb$_2$O$_5$ | 0.0527 λ | 360 V | 105 mA | Nb$_2$O$_5$ | 0.0527λ | 360 V | 105 mA |
| 4th Layer |  | SiO$_2$ | 0.1064 λ | 450 V | 160 mA | SiO$_2$ | 0.1084 λ | 450 V | 160 mA |
| 5th Layer | λ/2 | Nb$_{O5}$ | 0.1880 λ | 360 V | 105 mA | Nb$_2$O$_5$ | 0.1880 λ | 360 V | 105 mA |
| 6th Layer |  | SiO$_2$ | 0.0484 λ | 450 V | 160 mA | SiO$_2$ | 0.0484 λ | 450 V | 160 mA |
| 7th Layer |  | Nb$_2$O$_5$ | 0.1820 λ | 360 V | 105 mA | Nb$_2$O$_5$ | 0.1820 λ | 360 V | 105 mA |
| 8th Layer | λ/4 | SiO$_2$ | 0.2681 λ | 450 V | 160 mA | SiO$_2$ | 0.2681 λ | 450 V | 160 mA |
| Gas used for ion assistance |  | Ar gas for Nb and SiO$_2$ Mixed gas of O$_2$/Ar (9/1) for Nb$_2$O$_5$ | | | | Ar gas for Nb and SiO$_2$ Mixed gas of O$_2$/Ar (9/1) for Nb$_2$O$_5$ | | | |
| Evaluation of performance of plastic lens | | | | | | | | | |
| Luminous reflectance, Y % | | 0.68 % | | | | 0.68 % | | | |
| Luminous transmittance, Z % | | 99.3% | | | | 99.3% | | | |
| Adhesiveness | | 100/100 | | | | 100/100 | | | |
| Abrasion resistance | | UA to A | | | | UA to A | | | |
| Heat resistance | | 100° C. | | | | 100° C. | | | |
| Alkali resistance | | UA to A | | | | UA to A | | | |
| Impact resistance | | O | | | | O | | | |

Examples 7 to 24, and Comparative Examples 1 to 6

The physical properties of the optical elements obtained in Examples 7 to 24 and Comparative Examples 1 to 6 were evaluated according to the methods mentioned below.

(1) Melt Condition of Vapor-Depositing Composition:

The melt condition was determined according to the following criteria:

UA: Not splashed.

A: Splashed a little.

B: Splashed frequently.

C: Always splashed.

(2) Attachment State of Fine Particles:

After finishing vapor-deposition, the state of attachment of fine particles on the lens surface by splash in vapor-deposition was determined according to the following criteria:

UA: No fine particles are found.

A: Fine particles are found at 1 to 5 spots.

B: Fine particles are found at 6 to 10 spots.

C: Fine particles are found at 11 or more spots.

(3) Alkali Resistance Test:

A plastic lens was dipped in an aqueous 10% NaOH solution. After 30 minutes and 60 minutes, a determination was made as to whether or not the coating film of the lens had been peeled, and as to whether or not the lens surface had been roughened.

UA: Few peeled dots are found.

A: Small peeled dots of at most 0.1 mm in size are found on the entire surface, or a few peeled dots of around 0.3 mm in diameter are found.

B: The density of peeled dots is higher than in the rank A, and the proportion of larger peeled dots is higher than in the rank A.

C: Peeled dots of around 0.3 mm in size are found everywhere on the surface, or the density of small peeled dots is high.

D: Peeled dots are much found everywhere on the surface, and the surface looks white. All the others inferior to those samples are in the rank D.

(4) Abrasion Resistance Test:

The surface of a plastic lens is rubbed with steel wool of #0000 and a load of 2 kg being applied thereto. After 10 strokes of rubbing, the surface condition of the plastic lens was evaluated according to the following criteria:

UA: Scratched little.

A: Scratched slightly.

B: Much scratched.

C: Coating film swollen.

(5) Adhesiveness Test:

According to JIS-Z-1522, the surface of a plastic lens was cut to have 10×10 cross-cuts, and tested three times for cross-cut peeling with an adhesive tape, Cellotape. The number of the cross-cuts remaining was counted.

(6) Luminous Reflectance:

Using a spectrophotometer, U-3410 made by Hitachi, Ltd., the luminous reflectance, Y, of a plastic lens was measured.

(7) Luminous Transmittance:

Using a spectrophotometer, U-3410 made by Hitachi, Ltd., the luminous transmittance, Z, of a plastic lens was measured.

(8) Absorbance:

The absorbance of a plastic lens was obtained by subtracting the luminous reflectance and the luminous transmittance from 100%.

(9) Heat Resistance Test:

An optical element having an antireflection film immediately after forming a vapor deposition film was heated in an oven for 1 hour, and checked as to whether it was cracked or not. Specifically, it was heated first at 50° C., the temperature was then elevated at intervals of 5° C., and the temperature at which it cracked was read.

For the heat resistance test with a lapse of time, an optical element having an antireflection film immediately after forming a vapor deposition film was exposed in the air for 2 months, and evaluated in the same heat resistance test as above.

Preparation of Substrate A and Hard Coat Layer A

In the same manner as in Examples 1 to 6, a substrate A and a hard coat layer A were prepared.

Preparation of Substrate B and Hard Coat Layer B 142 parts by weight of an organosilicon compound, γ-glycidoxypropyltrimethoxysilane was charged into a glass container, to which were dropwise added 1.4 parts by weight of 0.01 N hydrochloric acid and 32 parts by weight of water with stirring. After completion of the addition, the mixture was stirred for 24 hours to obtain a solution of hydrolyzed γ-glycidoxypropyltrimethoxysilane. To the solution, 460 parts by weight of stannic oxide-zirconium oxide composite sol (dispersed in methanol, having a total metal oxide content of 31.5% by weight and having a mean particle size of from 10 to 15 millimicrons), 300 parts by weight of ethyl cellosolve, 0.7 parts by weight of a lubricant, silicone surfactant, and 8 parts by weight of a curing agent, aluminum acetylacetonate were added. After stirring well, the mixture was filtered to prepare a coating composition.

Next, a plastic lens substrate (a plastic lens for eyeglasses, EYAS (a trade name) made by Hoya Corporation, having a refractive index of at most 1.60—this may be hereinafter referred to as "substrate B"), which had been pretreated with an aqueous alkaline solution, was dipped in the coating solution. After dipping, the plastic lens was taken out at a pulling rate of 20 cm/min. Then, the plastic lens was heated at 120° C. for 2 hours to form a hard coat layer (the layer is referred to as "layer B").

Preparation of Substrate C and Hard Coat Layer C 100 parts by weight of an organosilicon compound, γ-glycidoxypropyltrimethoxysilane was charged into a glass container, to which were added 1.4 parts by weight of 0.01 N hydrochloric acid and 23 parts by weight of water with stirring. After the addition, the mixture was stirred for 24 hours to obtain a solution of hydrolyzed γ-glycidoxypropyltrimethoxysilane. Next, 200 parts by weight of an inorganic particulate substance, composite sol of particles composed mainly of titanium oxide, zirconium oxide and silicon oxide (dispersed in methanol, having a total solid content of 20% by weight and having a mean particle size of from 5 to 15 millimicrons—in this, the atomic ratio of Ti/Si in the core fine particles is 10, and the ratio by weight of the shell to the core is 0.25) was mixed with 100 parts by weight of ethyl cellosolve, 0.5 parts by weight of a lubricant, silicone surfactant, and 3.0 parts by weight of a curing agent, aluminum acetylacetonate. The resulting mixture was added to the solution of hydrolyzed γ-glycidoxypropyltrimethoxysilane, and stirred well. The mixture was filtered to prepare a coating solution.

Next, a plastic lens substrate (a plastic lens for eyeglasses, TESLAID (a trade name) made by Hoya Corporation, having a refractive index of 1.71—this may be hereinafter referred to as "substrate C"), which had been pretreated with an aqueous alkaline solution, was dipped in the coating solution. After completion of dipping, the plastic lens was taken out at a pulling rate of 20 cm/min. Then, the plastic lens was heated at 120° C. for 2 hours to form a hard coat layer (the layer is referred to as "layer C").

Preparation of Basic Layer and Antireflection Film

Next, a multi-layered functional film as shown in Tables 4 to 7 was formed on the hard coat layer A, B or C, according to the process condition shown in Tables 4 to 7. Plastic lenses were obtained in this manner.

The plastic lenses were evaluated according to the test methods (1) to (7) mentioned above, and the results are shown in the Tables. As in the earlier Tables, λ indicates the wavelength of the light applied, and λ=500 nm.

In Examples 7 to 12, the composition A in the Tables was subjected to film formation without ion assistance. The film made of composition A in Examples 13 to 18, and the niobium oxide layer in Examples 19 to 24 were formed according to an ion-assisted process, in which the ratio of oxygen/argon was 9/1, and the ion gun condition was 320 V and 140 mA. In Examples 25 to 27, the high-refraction substance used was titanium oxide, and the film was formed without ion assistance.

The composition A for Examples 7 to 18 in Tables 4 and 5 was a film made of a three-component vapor-deposited composition, which was prepared by mixing $Nb_2O_5$ powder, $ZrO_2$ powder and $Y_2O_3$ powder and then sintering the mixture under a pressure of 300 kg/cm² at a temperature of 1300° C. ($Nb_2O_5/ZrO_2/Y_2O_3$=(76 to 90%)/(16.6 to 5%)/(7.4 to 5%), on a weight basis).

The resultant refractive indices of the equivalent films, λ/4 and λ/2 in Examples 1 to 27 are shown in Table 8.

In Comparative Examples 1 and 2, tantalum oxide was used as the high-refraction vapor-deposited substance. In these examples, a basic layer composed of silicon dioxide; a two-layered equivalent film of λ/4 composed of a tantalum oxide layer and a silicon dioxide layer; a tantalum oxide layer of λ/2; and a silicon dioxide layer of λ/4 were formed.

In Comparative Example 3, the hard coat layer C, the substrate C, and tantalum oxide as the high-refraction vapor-deposited substance were used. In this example, a third layer composed of silicon dioxide, a two-layered equivalent film of λ/4 composed of a tantalum oxide layer and a silicon dioxide layer, a tantalum oxide layer of λ/2, and a silicon dioxide layer of λ/4 were formed.

In Comparative Examples 4 and 5, titanium oxide was used as the high-refraction vapor-deposited substance. In these examples, a basic layer composed of silicon dioxide, a two-layered equivalent film of λ/4 composed of a titanium oxide layer and a silicon dioxide layer, a titanium oxide layer of λ/2, and a silicon dioxide layer of λ/4 were formed.

In Comparative Example 6, the hard coat layer C, the substrate C, and titanium oxide as the high-refraction vapor-deposited substance were used. In this example, a 3rd layer composed of silicon dioxide, a two-layered equivalent film of λ/4 composed of a titanium oxide layer and a silicon dioxide layer, a titanium oxide layer of λ/2, and a silicon dioxide layer of λ/4 were formed. In these Comparative Examples 1 to 6, the films were formed without ion assistance. These comparative examples are further described in Table 9.

The optical elements of Comparative Examples 1, 2 and 3 were inferior in their heat resistance to those in Examples 22, 23 and 24, respectively.

TABLE 4

| Plastic lens substrate Hard coat layer | | Example 7 Substrate A Layer A | Example 8 Substrate B Layer B | Example 9 Substrate C Layer C | Example 10 Substrate A Layer A | Example 11 Substrate B Layer B | Example 12 Substrate C Layer C |
|---|---|---|---|---|---|---|---|
| 1st Layer | Basic layer | SiO₂ | SiO₂ | SiO₂ | SiO₂ | SiO₂ | SiO₂ |
| Film thickness (λ) | | 0 459 | 0.4568 | 0.0698 | 0 801 | 0.6121 | 0.1123 |
| 2nd Layer | λ/4 | Composition A | Composition A | Composition A | Composition A | Composition A | Composition A |
| Film thickness (λ) | | 0 0458 | 0.0549 | 0.0407 | 0.032 | 0.0485 | 0.0287 |
| 3rd Layer | | SiO₂ | SiO₂ | SiO₂ | SiO₂ | SiO₂ | SiO₂ |
| Film thickness (λ) | | 0.0809 | 0.0671 | 0.5275 | 0.102 | 0.1004 | 0.5762 |
| 4th Layer | λ/2 | Composition A | Composition A | Composition A | Composition A | Composition A | Composition A |
| Film thickness (λ) | | 0 14 | 0.1194 | 0.1179 | 0.143 | 0.16 | 0.1035 |
| 5th Layer (λ) | | SiO₂ | SiO₂ | SiO₂ | SiO₂ | SiO₂ | |
| Film thickness (λ) | | 0 0597 | 0 0543 | 0.0873 | 0.0584 | 0.0519 | 0.1017 |
| 6th Layer | | Composition A | Composition A | Composition A | Composition A | Composition A | Composition A |
| Film thickness (λ) | | 0 172 | 0 1658 | 0.1731 | 0.1603 | 0.1685 | 0.1484 |
| 7th Layer | λ/4 | SiO₂ | SiO₂ | SiO₂ | SiO₂ | SiO₂ | SiO₂ |
| Film thickness (λ) | | 0.2795 | 0 2673 | 0.2839 | 0.287 | 0.2911 | 0.309 |
| Melt condition of vapor-depositing composition | | UA | UA | UA | UA | UA | UA |
| Attachment of vapor-deposited fine particles | | UA | UA | UA | UA | UA | UA |
| Alkali resistance | | UA | UA | UA | UA | UA | UA |
| Abrasion resistance | | UA | UA | UA | UA | UA | UA |
| Adhesiveness | | 100 | 100 | 100 | 100 | 100 | 100 |
| Luminous reflectance Y (%) | | 0.84 | 0 84 | 0.92 | 0.8 | 1.02 | 1 05 |
| Luminous transmittance Z (%) | | 99.01 | 99 | 98 9 | 99 | 98.74 | 98 7 |
| Absorbance, 100-Y-Z (%) | | 0.15 | 0.16 | 0.18 | 0.2 | 0.24 | 0.25 |
| Heat resistance (°C.) | | 100 | 110 | 100 | 100 | 110 | 100 |
| Heat resistance (°C.) alter exposure in the air for 2 months | | 85 | 95 | 85 | 85 | 95 | 85 |

TABLE 5

| Plastic lens substrate Hard coat layer | | Example 13 Substrate A Layer A | Example 14 Substrate B Layer B | Example 15 Substrate C Layer C | Example 16 Substrate A Layer A | Example 17 Substrate B Layer B | Example 18 Substrate C Layer C |
|---|---|---|---|---|---|---|---|
| 1st Layer | Basic layer | SiO₂ | SiO₂ | SiO₂ | SiO₂ | SiO₂ | SiO₂ |
| Film thickness (λ) | | 0.3101 | 0 4156 | 0.0886 | 0.7431 | 0.5869 | 0.087 |
| 2nd Layer | λ/4 | Composition A | Composition A | Composition A | Composition A | Composition A | Composition A |
| Film thickness (λ) | | 0.0374 | 0.0118 | 0 0446 | 0.0355 | 0.0317 | 0.0424 |
| 3rd Layer | | SiO₂ | SiO₂ | SiO₂ | SiO₂ | SiO₂ | 0.5797 |
| Film thickness (λ) | | 0.113 | 0.091 | 0.5784 | 0.1308 | 0.0898 | 0.5762 |
| 4th Layer | λ/2 | Composition A | Composition A | Composition A | Composition A | Composition A | Composition A |
| Film thickness (λ) | | 0.1616 | 0.0932 | 01112 | 0.1568 | 0.1288 | 0.1013 |
| 5th Layer | | SiO₂ | SiO₂ | SiO₂ | SiO₂ | SiO₂ | SiO₂ |
| Film thickness (λ) | | 0.0586 | 0.1036 | 0 0961 | 0.069 | 0.0816 | 0.1058 |
| 6th Layer | | Composition A | Composition A | Composition A | Composition A | Composition A | Composition A |
| Film thickness (λ) | | 0 1815 | 0 1362 | 0 1615 | 0.176 | 0.1437 | 0.1438 |
| 7th Layer | λ/4 | SiO₂ | SiO₂ | SiO₂ | SiO₂ | SiO₂ | SiO₂ |
| Film thickness (λ) | | 0.2668 | 0.2906 | 0.282 | 0.2763 | 0.2888 | 0.2824 |
| Melt condition of vapor-depositing composition | | UA | UA | UA | UA | UA | UA |
| Attachment of vapor-deposited fine particles | | UA | UA | UA | UA | UA | UA |
| Alkali resistance | | UA | UA | UA | UA | UA | UA |
| Abrasion resistance | | UA | UA | UA | UA | UA | UA |
| Adhesiveness | | 100 | 100 | 100 | 100 | 100 | 100 |
| Luminous reflectance Y (%) | | 0.8 | 0.84 | 0.81 | 0.8 | 1.02 | 1.08 |
| Luminous transmittance Z (%) | | 99.05 | 99.01 | 99 | 99.01 | 98.75 | 98 68 |
| Absorbance, 100-Y-Z (%) | | 0.15 | 0.17 | 0.19 | 0.19 | 0.23 | 0 24 |

TABLE 5-continued

| Plastic lens | Example 13 | Example 14 | Example 15 | Example 16 | Example 17 | Example 18 |
| --- | --- | --- | --- | --- | --- | --- |
| substrate | Substrate A | Substrate B | Substrate C | Substrate A | Substrate B | Substrate C |
| Hard coat layer | Layer A | Layer B | Layer C | Layer A | Layer B | Layer C |
| Heat resistance (° C.) | 105 | 120 | 105 | 105 | 120 | 105 |
| Heat resistance (° C.) alter exposure in the air for 2 months | 90 | 105 | 90 | 90 | 105 | 90 |

TABLE 6

| Plastic lens substrate Hard coat layer | | | Example 19 Substrate A Layer A | Example 20 Substrate B Layer B | Example 21 Substrate C Layer C | Example 22 Substrate A Layer A | Example 23 Substrate B Layer B | Example 24 Substrate C Layer C |
| --- | --- | --- | --- | --- | --- | --- | --- | --- |
| 1st Layer | Basic | | $SiO_2$ | $SiO_2$ | $SiO_2$ | $SiO_2$ | $SiO_2$ | $SiO_2$ |
| Film thickness (λ) | layer | | 0.3101 | 0.4156 | 0.0886 | 0 0478 | 0.4729 | 0.074 |
| 2nd Layer | | λ/4 | $Nb_2O_5$ | $Nb_2O_5$ | $Nb_2O_5$ | $Ta_2O_5$ | $Ta_2O_5$ | $Ta_2O_5$ |
| Film thickness (λ) | | | 0.0374 | 0.0118 | 0.0446 | 0.0829 | 0.0849 | 0.0504 |
| 3rd Layer | | | $SiO_2$ | $SiO_2$ | $SiO_2$ | $SiO_2$ | $SiO_2$ | $SiO_2$ |
| Film thickness (λ) | | | 0.113 | 0.091 | 0.5784 | 0.067 | 0.0648 | 0.5334 |
| 4th Layer | | | $Nb_2O_5$ | $Nb_2O_5$ | $Nb_2O_5$ | $Ta_2O_5$ | $Ta_2O_5$ | $Ta_2O_5$ |
| Film thickness (λ) | | | 0.1616 | 0.0932 | 0.1112 | 0.1533 | 0.1259 | 0.1038 |
| 5th Layer | | λ/2 | $SiO_2$ | $SiO_2$ | $SiO_2$ | $SiO_2$ | $SiO_2$ | $SiO_2$ |
| Film thickness (λ) | | | 0.0586 | 0.1036 | 0.0961 | 0.025 | 0.0266 | 0.0869 |
| 6th Layer | | | $Nb_2O_5$ | $Nb_2O_5$ | $Nb_2O_5$ | $Ta_2O_5$ | $Ta_2O_5$ | $Ta_2O_5$ |
| Film thickness (λ) | | | 0.1815 | 0 1362 | 0.1615 | 0.1533 | 0.1259 | 0.1693 |
| 7th Layer | | λ/4 | $SiO_2$ | $SiO_2$ | $SiO_2$ | $SiO_2$ | $SiO_2$ | $SiO_2$ |
| Film thickness (λ) | | | 0.2668 | 0.2906 | 0.282 | 0.254 | 0.2588 | 0.2773 |
| Melt condition of vapor-deposfing composition | | | B | B | B | UA | UA | UA |
| Attachment of vapor-deposited fine particles | | | UA | UA | UA | UA | UA | UA |
| Alkali resistance | | | UA | UA | UA | UA | UA | UA |
| Abrasion resistance | | | UA | UA | UA | UA | UA | UA |
| Adhesiveness | | | 100 | 100 | 100 | 100 | 100 | 100 |
| Luminous reflectance Y (%) | | | 0.8 | 0.84 | 0.81 | 0.99 | 1.02 | 1.05 |
| Luminous transmittance Z (%) | | | 99.05 | 99.01 | 99 | 98.85 | 98.74 | 98.7 |
| Absorbance, 100-Y-Z (%) | | | 0 15 | 0 17 | 0.19 | 0 16 | 0 24 | 0 25 |
| Heat resistance (° C.) | | | 105 | 120 | 105 | 100 | 110 | 100 |
| Heat resistance (° C.) after exposure in the air for 2 months | | | 90 | 105 | 90 | 85 | 95 | 85 |

TABLE 7

| Plastic lens substrate Hard coat layer | Basic layer | Example 25 Substrate A Layer A | Example 26 Substrate B Layer B | Example 27 Substrate C Layer C |
| --- | --- | --- | --- | --- |
| 1st Layer | | $SiO_2$ | $SiO_2$ | $SiO_2$ |
| Film thickness (λ) | | 0.51 | 0.421 | 0.079 |
| 2nd Layer | λ/4 | $TiO_2$ | $TiO_2$ | $TiO_2$ |
| Film thickness (λ) | | 0.0435 | 0.0224 | 0.275 |
| 3rd Layer | | $SiO_2$ | $SiO_2$ | $SiO_2$ |
| Film thickness(λ) | | 0.1089 | 0.0972 | 0.5761 |
| 4th Layer | | $TiO_2$ | $TiO_2$ | $TiO_2$ |
| Film thickness (λ) | | 0.1468 | 0.1327 | 0.135 |
| 5th Layer | λ/2 | $SiO_2$ | $SiO_2$ | $SiO_2$ |
| Film thickness (λ) | | 0.0689 | 0.0768 | 0.102 |
| 6th Layer | | $TiO_2$ | $TiO_2$ | $TiO_2$ |
| Film thickness (λ) | | 0.1474 | 0.1665 | 0 143 |
| 7th Layer | λ/4 | $SiO_2$ | $SiO_2$ | $SiO_2$ |
| Film thickness (λ) | | 0.2716 | 0.291 | 0.2954 |

TABLE 7-continued

| Plastic lens substrate<br>Hard coat layer | Basic layer | Example 25<br>Substrate A<br>Layer A | Example 26<br>Substrate B<br>Layer B | Example 27<br>Substrate C<br>Layer C |
|---|---|---|---|---|
| Melt condition of vapor-depositing composition | | UA | UA | UA |
| Attachment of vapor-deposited fine particles | | UA | UA | UA |
| Alkali resistance | | UA to A | UA to A | UA to A |
| Abrasion resistance | | A | A | A |
| Adhesiveness | | 100 | 100 | 100 |
| Luminous reflectance Y (%) | | 0.84 | 0.081 | 0.81 |
| Luminous transmittance Z (%) | | 99 | 99.02 | 99 |
| Absorbance, 100-Y-Z (%) | | 0.16 | 0.17 | 0.19 |
| Heat resistance (° C.) | | 90 | 110 | 95 |
| Heat resistance (° C.) after exposure in the air for 2 months | | 70 | 90 | 75 |

TABLE 8

| | Example 1 | Example 2 | Example 3 | Example 4 | Example 5 | Example 6 |
|---|---|---|---|---|---|---|
| 1/4 λ | 1.75 to 1.80 | 1.70 to 1.75 | 1.65 to 1.70 | 1.65 to 170 | 1.70 to 1.75 | 1.70 to 1.75 |
| 1/2 λ | 2.20 to 2.25 | 2.05 to 2.10 | 2.0 to 2.05 | 2 0 to 2.05 | 2.05 to 2.10 | 2.05 to 2.10 |
| | Example 7 | Example 8 | Example 9 | Example 10 | Example 11 | Example 12 |
| 1/4 λ | 1.70 to 1.75 | 1.70 to 1.75 | 1.65 to 1.70 | 1 67 to 1.72 | 1.70 to 1.75 | 1.65 to 1.70 |
| 1/2 λ | 2.05 to 2.10 | 2.05 to 2.10 | 2.0 to 2.05 | 2.05 to 2.10 | 2.05 to 2.10 | 2.0 to 2.05 |
| | Example 13 | Example 14 | Example 15 | Example 16 | Example 17 | Example 18 |
| 1/4 λ | 1.70 to 1.75 | 1.65 to 1.70 | 1.65 to 1.70 | 1.72 to 1.77 | 1.72 to 1.77 | 1.65 to 1.70 |
| 1/2 λ | 2.05 to 2.10 | 2.0 to 2.05 | 2.05 to 2.10 | 2.05 to 2.10 | 2.0 to 2.05 | 2.05 to 2.10 |
| | Example 19 | Example 20 | Example 21 | Example 22 | Example 23 | Example 24 |
| 1/4 λ | 1.70 to 1.75 | 1.65 to 1.70 | 1.65 to 1.70 | 1.65 to 1.70 | 1.70 to 1.75 | 1.65 to 1.70 |
| 1/21 λ | 2 05 to 2.10 | 2.0 to 2.05 | 2.05 to 2.10 | 1.95 to 1.20 | 1.90 to 1.95 | 1.85 to 1.90 |
| | Example 25 | Example 26 | Example 27 | | | |
| 1/4 λ | 1.70 to 1.75 | 1 70 to 1.75 | 1.65 to 1.70 | | | |
| 1/2 λ | 2.0 to 2.05 | 2.0 to 2.05 | 1.95 to 2.00 | | | |

TABLE 9

| | Comparative Example. 1<br>Substrate A<br>Layer A | Comparative Example. 2<br>Substrate B<br>Layer B | Comparative Example. 3<br>Substrate C<br>Layer C | Comparative Example. 4<br>Substrate A<br>Layer A | Comparative Example. 5<br>Substrate B<br>Layer B | Comparative Example. 6<br>Substrate C<br>Layer C |
|---|---|---|---|---|---|---|
| Plastic lens substrate<br>Hard coat layer | | | | | | |
| 1st Layer | $SiO_2$ | $SiO_2$ | $SiO_2$ | $SiO_2$ | $SiO_2$ | $SiO_2$ |
| Film thickness (λ) | 0.515 | 0.481 | 0.561 | 0.49 | 0.462 | 0.0727 |
| 2nd Layer | $Ta_2O_5$ | $Ta_2O_5$ | $Ta_2O_5$ | $TiO_2$ | $TiO_2$ | $TiO_2$ |
| Film thickness (λ) | 0.0781 | 0.0636 | 0.0335 | 0.0632 | 0.0598 | 0.026 |
| 3rd Layer | $SiO_2$ | $SiO_2$ | $SiO_2$ | $SiO_2$ | $SiO_2$ | $SiO_2$ |
| Film thickness (λ) | 0.0429 | 0.0588 | 0.522 | 0.086 | 0 0803 | 0.525 |
| 4th Layer | $Ta_2O_5$ | $Ta_2O_5$ | $Ta_2O_5$ | $TiO_2$ | $TiO_2$ | $TiO_2$ |
| Film thickness (λ) | 0.4204 | 0.4205 | 0.054 | 0.488 | 0.5044 | 0.061 |
| 5th Layer | $SiO_2$ | $SiO_2$ | $SiO_2$ | $SiO_2$ | $SiO_2$ | $SiO_2$ |
| Film thickness (λ) | 0.247 | 0 2351 | 0 054 | 0 249 | 0.0781 | 0.049 |
| 6th Layer | | | $Ta_2O_5$ | | | $TiO_2$ |
| Film thickness (λ) | | | 0.421 | | | 0.486 |
| 7th Layer | | | $SiO_2$ | | | $SiO_2$ |
| Film thickness (λ) | | | 0.253 | | | 0 248 |
| Melt condition of vapor-depositing composition | A | A | A | UA | UA | UA |
| Attachment of vapor-deposited fine particles | UA | UA | UA | UA | UA | UA |
| Alkat resistance | UA | UA to A | UA | B | B | B |
| Abrasion resistance | UA | UA to A | UA | B | B | B |
| Adhesiveness | 100 | 100 | 100 | 100 | 100 | 100 |
| Luminous reflectance Y (%) | 1.05 | 1.1 | 1.05 | 0.98 | 0.93 | 0.97 |
| Luminous transmittance Z (%) | 98.71 | 98.65 | 98.6 | 98.8 | 98.78 | 98.67 |

TABLE 9-continued

| Plastic lens substrate<br>Hard coat layer | Comparative Example. 1<br>Substrate A<br>Layer A | Comparative Example. 2<br>Substrate B<br>Layer B | Comparative Example. 3<br>Substrate C<br>Layer C | Comparative Example. 4<br>Substrate A<br>Layer A | Comparative Example. 5<br>Substrate B<br>Layer B | Comparative Example. 6<br>Substrate C<br>Layer C |
|---|---|---|---|---|---|---|
| Absorbance, 100-Y-Z (%) | 0.24 | 0.25 | 0.35 | 0.22 | 0.29 | 0.36 |
| Heat resistance (° C.) | 85 | 110 | 85 | 70 | 95 | 80 |
| Heat resistance (° C.) after exposure in the air for 2 months | 55 | 85 | 60 | 45 | 70 | 50 |

As described in detail hereinabove, an optical element having an antireflection film of the invention is characterized by good luminous reflectance, luminous transmittance, adhesiveness, abrasion resistance, alkali resistance and impact resistance, and has the additional advantage of improved heat resistance.

What is claimed is:

1. An optical element comprising
   a plastic substrate,
   a basic layer of metallic niobium, and
   an antireflection film formed on said basic layer, which comprises an equivalent film $\lambda/2$ containing at least three layers and having a refractive index of from 1.80 to 2.40 wherein the even-numbered layer(s) of the equivalent film is a silicon dioxide layer or a layer made of a silicon dioxide as a main component and wherein the antireflective film also contains at least one equivalent film $\lambda/4$ on each side of the equivalent film $\lambda/2$.

2. The optical element of claim 1, wherein an odd-numbered layer of the equivalent film $\lambda/2$ is a layer made of at least one metal oxide selected from titanium oxide, niobium oxide and tantalum oxide.

3. The optical element of claim 1, wherein an odd-numbered layer of the equivalent film $\lambda/2$ is a layer made of niobium oxide.

4. The optical element of any one of claims 1 to 3, wherein the equivalent film $\lambda/4$ formed between the substrate and the equivalent layer $\lambda/2$ is a film of at least two layers.

5. The optical element of claim 4, wherein the layers of equivalent film $\lambda/4$ are constructed of the same metal oxide layers used in the odd-numbered and even-numbered layers of equivalent film $\lambda/2$.

6. The optical element of claim 4, wherein the equivalent film $\lambda/4$ formed between the substrate and the equivalent layer $\lambda/2$ is constructed of a layer made of niobium oxide and a layer made of silicon dioxide.

7. The optical element of claim 4, wherein the equivalent film $\lambda/2$ contains, in order, a high-refraction layer, a silicon dioxide layer and a high-refraction layer.

8. The optical element of claim 7, wherein the high-refraction layers comprise at least one metal oxide selected from titanium oxide, niobium oxide and tantalum oxide.

9. An optical element having an antireflection film comprising a plastic substrate having a basic layer and an antireflection film of a $\lambda/4$-$\lambda/2$-$\lambda/4$ type provided thereon, wherein
   the basic layer and the antireflection film are of a eight layer construction having a basic layer of metallic niobium, equivalent film $\lambda/4$ ($1^{st}$ to $3^{rd}$ layers), equivalent film $\lambda/2$ ($4^{th}$ to $6^{th}$ layers), and equivalent film $\lambda/4$ ($7^{th}$ layer), and wherein
   the $1^{st}$ layer is a silicon dioxide layer having a refractive index of from 1.43 to 1.47,
   the $2^{nd}$ layer is a high refraction layer having a refractive index of from 2.04 to 2.37,
   the $3^{rd}$ layer is a silicon dioxide layer having a refractive index of from 1.43 to 1.47,
   the $4^{th}$ layer is a high-refraction layer having a refractive index of from 2.04 to 2.37,
   the $5^{th}$ layer is a silicon dioxide layer having a refractive index of from 1.43 to 1.47,
   the $6^{th}$ layer is a high-refraction layer having a refractive index of from 2.04 to 2.37,
   the $7^{th}$ layer is a silicon dioxide layer having a refractive index of from 1.43 to 1.47,
   the resultant refractive index of $\lambda/4$ ($1^{st}$ to 3rd layers) is from 1.65 to 1.80,
   the resultant refractive index of $\lambda/2$ ($4^{th}$ to $6^{th}$ layers) is from 1.85 to 2.25,
   the high-refraction layers ($2^{nd}$, $4^{th}$ and $6^{th}$ layers) are each constructed of at least one metal oxide selected from titanium oxide, niobium oxide and tantalum oxide.

10. An optical element according to any one of claims 1–3 or 9 having a cured film obtained by curing a coating composition which comprises metal oxide colloid particles and an organosilicon compound between the plastic substrate and the basic layer.

11. An optical element comprising
    a plastic substrate,
    a cured film obtained by curing a coating composition which comprises metal oxide colloid particles and an organosilicon compound on said plastic substrate,
    a basic layer of silicon dioxide in direct contact with said cured film,
    an antireflection film formed on direct contact with said basic layer, which comprises an equivalent film $\lambda/2$ containing at least three layers and having a refractive index of from 1.80 to 2.40 wherein the even-numbered layer(s) of the equivalent film is a silicon dioxide layer or a layer made of silicon dioxide as a main component and wherein the antireflection film also contains at least one equivalent film $\lambda/4$ on each side of the equivalent film $\lambda/2$.

12. The optical element of claim 11, wherein an odd-numbered layer of the equivalent film $\lambda/2$ is a layer made of at least one metal oxide selected from titanium oxide, niobium oxide and tantalum oxide.

13. The optical element of claim 11, wherein an odd-numbered layer of the equivalent film $\lambda/2$ is a layer made of niobium oxide.

14. The optical element of anyone of claims 11 to 13, wherein the equivalent film $\lambda/4$ formed between the substrate and the equivalent layer $\lambda/2$ is a film of at least two layers.

15. The optical element of claim 14, wherein the layers of equivalent film $\lambda/4$ are constructed of the same metal oxide layers used in the odd-numbered and even-numbered layers of equivalent film λ/2.

16. The optical element of claim 14, wherein the equivalent film λ/4 formed between the substrate and the equivalent layer λ/2 is constructed of a layer made of niobium oxide and a layer made of silicon dioxide.

17. The optical element of claim 14, wherein the equivalent film λ/2 contains, in order, a high-refraction layer, a silicon dioxide layer and a high-refraction layer.

* * * * *